United States Patent

Henseler et al.

Patent Number: 5,810,385
Date of Patent: Sep. 22, 1998

[54] COLLISION-PROTECTION SYSTEM HAVING AN AIRBAG

[75] Inventors: Wolfgang Henseler, Tübingen; Manfred Müller, Deizisau; Egon Katz, Nagold; Guido Wetzel, Böblingen; Luigi Brambilla, Böblingen, all of Germany

[73] Assignee: Mercedes-Benz AG, Stuttgart, Germany

[21] Appl. No.: 76,789

[22] Filed: Jun. 15, 1993

[30] Foreign Application Priority Data

Jun. 23, 1992 [DE] Germany ................ 42 20 499.2

[51] Int. Cl.⁶ .................................................. B60R 21/16
[52] U.S. Cl. .................................... 280/728.1; 280/743.1; 280/743.2
[58] Field of Search .................. 280/728 R, 728 A, 280/730 R, 743 A, 743 R, 731, 732

[56] References Cited

U.S. PATENT DOCUMENTS

| | | |
|---|---|---|
| 3,638,755 | 2/1972 | Sack . |
| 3,879,056 | 4/1975 | Kawashima et al. . |
| 4,944,527 | 7/1990 | Bishop et al. .................. 280/741 |
| 4,964,654 | 10/1990 | Bishop et al. ................ 280/728 A |
| 5,004,266 | 4/1991 | Miller et al. ................. 280/743 A |
| 5,022,675 | 6/1991 | Zelenak, Jr. et al. .......... 280/743 R |
| 5,062,664 | 11/1991 | Bishop et al. ................ 280/728 A |

FOREIGN PATENT DOCUMENTS

| | | | |
|---|---|---|---|
| 1781383 | 12/1970 | Germany . | |
| 2152635 | 10/1971 | Germany . | |
| 2152902 | 4/1973 | Germany . | |
| 4137691 | 11/1992 | Germany . | |
| 3-136946 | 6/1991 | Japan | 280/743 A |
| 3-248934 | 11/1991 | Japan | 280/743 A |

*Primary Examiner*—Eric D. Culbreth
*Attorney, Agent, or Firm*—Evenson McKeown Edwards & Lenahan PLLC

[57] ABSTRACT

The invention relates to a collision-protection system for passengers of motor vehicles. In a manner which is known in principle, an airbag is automatically inflated in the event of an accident. In order to control the direction and speed of expansion, the airbag is wholly or partially encased by a tough, plastically deformable film, which is overstretched and torn open as the airbag is inflated.

2 Claims, 1 Drawing Sheet

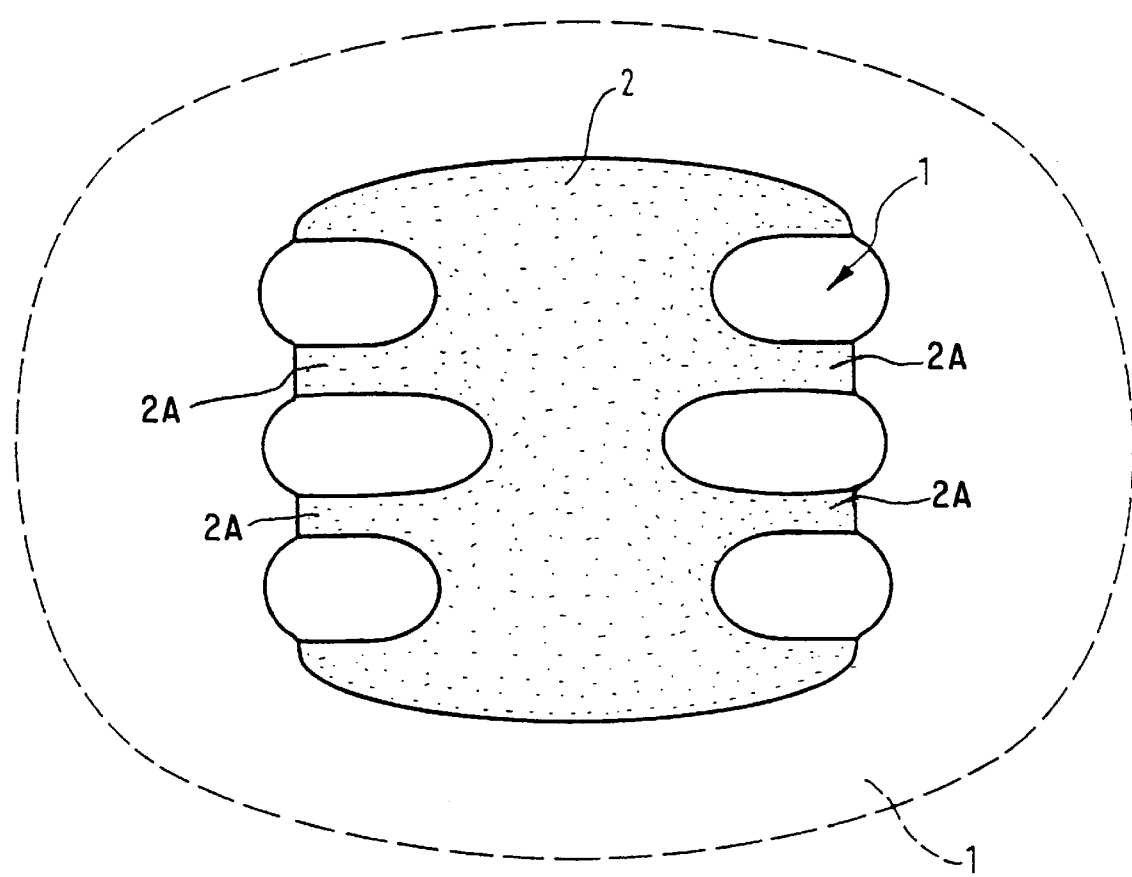

COLLISION-PROTECTION SYSTEM HAVING AN AIRBAG

BACKGROUND AND SUMMARY OF THE INVENTION

The invention relates to a collision-protection system for passengers of motor vehicles, having a gasbag (airbag) which is accommodated when not in use, in the collapsed or folded-up state, in a vehicle-side receptacle. In the event of an accident the airbag is automatically inflated by means of an assigned gas generator with the formation of a cushion protecting the passenger while a casing wholly or partially enclosing the collapsed or folded-up airbag is torn open.

In the case of a collision-protection system of this type known from U.S. Pat. No. 4,944,527, the casing is configured such that it tears open virtually immediately once the airbag has begun to be inflated. It is thereby intended to ensure that the expansion of the gasbag as it is inflated is virtually not influenced by the casing.

The same system in principle is envisaged according to German Published Application DOS 41 37 691 which, although not pre-published, is based upon a former application. Here, the casing is configured as a shrink film having a predetermined breaking point, which tears open as the expansion of the airbag begins.

In addition, it is known in principle, in collision-protection systems which are already inserted as standard, to control the direction and speed of expansion of the airbag as it is inflated by the fact that disposed on the airbag there are catch bands and/or tear seams which only yield to the inflation pressure of the airbag after a certain delay or which hold individual regions of the airbag in a predetermined position.

It is known, for example, from German Patent Specification 21 52 902, in the case of an airbag accommodated in a hub part of the steering wheel, to configure its central region which faces the driver in the inflated state, in reinforced construction and to hold it with bands, against the inflation pressure, at a desired distance from the steering wheel. At the same time, this reinforced region of the airbag casing serves on the inside as an impact surface for the gas current generated by the gas generator and hence serves to deflect the gas current to the marginal regions of the airbag.

According to German Published Application DOS 21 52 635, it is envisaged to dispose within the airbag a smaller burstable primary bag, which is first inflated by the gas generator in the event of an accident, whereas the airbag itself is only filled with gas once the primary bag has burst.

From German Patent Specification 17 81 383, it is known in principle to make the airbag out of an irreversibly stretchable material, so that the casing of the inflated airbag can additionally expand if the vehicle passenger in question crashes onto the airbag. It is thereby intended to prevent the passenger from being thrown back with great force upon collision with the airbag, as would be possible in the case of an elastically stretchable airbag casing.

An object of the invention is now to provide a new and advantageous option for influencing the speed or direction of expansion of the airbag as it is inflated.

This object is achieved by the fact that a tough plastically deformable film is provided as the casing, which, as the airbag is inflated, is initially expanded, the expansion of the airbag being delayed and the direction and speed of expansion being controlled, and is then overstretched until being torn open.

It is here envisaged, in particular preferred embodiments, that the resistance which the film offers to the expansion of the airbag as this is inflated increases analogously to the stretch characteristics of the film and then, in an overstretching phase prior to the bursting of the film, declines.

The invention makes use of the recognition that synthetic films can be made having very different deformation behavior. It is here particularly advantageous, for the controlled expansion of the airbag, that the resistance initially generated by the film should grow as the film is stretched and should then be able to decline relatively slowly prior to the bursting of the film. In this way, the expansion of the airbag following ignition of the gas generator is initially delayed in the desired manner; afterwards, the resistance generated by the film hesitantly declines, so that, in spite of the diminishing restraining force of the film, the expansion motion of the airbag continues to be influenced.

Other objects, advantages and novel features of the present invention will become apparent from the following detailed description of the invention when considered in conjunction with the accompanying drawings.

BRIEF DESCRIPTION OF THE DRAWINGS

The single FIGURE shows a top view onto an already partially inflated airbag which is partially encased, according to the invention, by a synthetic film.

DETAILED DESCRIPTION OF THE DRAWINGS

The partially inflated airbag 1 represented in the drawing can be inflated, for example, up to a size indicated by the dashed line 1'.

The airbag 1 is encased in certain regions by a synthetic film 2, which forms in the drawing a broad band running continuously from top to bottom, from which band narrower bands 2A branch off laterally, all bands on the non-visible rear side of the airbag 1 being mounted on fixed and load-bearing parts of a motor vehicle. Whereas the narrow bands 2A of the synthetic film 2 offer a relatively small resistance to the expanding airbag 1, the resistance of the broad band region of the synthetic film 2 is correspondingly greater. Accordingly, the airbag 1 in the drawing expands to the right and to the left faster than upwards, downwards and in the direction of the passenger.

Before the airbag 1 reaches its fully inflated state, the synthetic film 2 bursts, beginning at the narrow bands 2A.

The casing is configured of a tough plastically deformable synthetic film material which, once subjected to forces from the expanding airbag, initially stretches and provides growing resistance during initial expansion of the airbag, secondly stretches further in an overstretching phase and provides relatively slowly declining resistance to further expansion of the airbag, and lastly provides release of resistance through expansion of the airbag upon bursting of the film material.

In this way, the expansion procedure of the airbag 1 can be significantly influenced, thereby ensuring, in particular, that the airbag 1 is expanded in a particularly easily reproducible manner.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Collision protection system for passengers of motor vehicles comprising:

an airbag which is accommodated in a folded up storage condition in a vehicle-side receptacle and which is automatically expanded by an assigned gas generator in an event of an accident to form an airbag cushion protecting a passenger, and a casing at least partially enclosing the airbag in its folded up storage condition, said casing serving to delay and control the expansion of the airbag, wherein said casing is composed of a tough plastically deformable synthetic film material which, when subjected to forces from the expanding airbag, initially stretches and provides growing resistance to initial expansion of the airbag, secondly stretches further in an overstretching phase and provides slowly declining resistance to further expansion of the airbag, and lastly provides release of resistance to expansion of the airbag upon bursting of the film material.

2. Collision-protection system according to claim 1, wherein the casing is configured to include narrow and wide sections with different airbag resistance characteristics in respective different directions of expansion of the airbag.

* * * * *